(12) United States Patent
Lesage et al.

(10) Patent No.: US 10,539,131 B2
(45) Date of Patent: Jan. 21, 2020

(54) ELECTRO HYDROSTATIC ACTUATOR

(71) Applicant: Goodrich Actuation Systems SAS, Saint Ouen l'Aumone (FR)

(72) Inventors: Emmanuel Lesage, Aulnay sur Iton (FR); Jean-Michel Perrochat, Chaville (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 0 days.

(21) Appl. No.: 16/016,891

(22) Filed: Jun. 25, 2018

(65) Prior Publication Data
US 2019/0017501 A1 Jan. 17, 2019

(30) Foreign Application Priority Data

Jul. 17, 2017 (EP) ..................... 17305944

(51) Int. Cl.
*F04B 49/24* (2006.01)
*B64C 13/50* (2006.01)
(Continued)

(52) U.S. Cl.
CPC .............. *F04B 49/24* (2013.01); *B64C 13/40* (2013.01); *B64C 13/504* (2018.01); *F04B 1/124* (2013.01); *F04B 1/145* (2013.01); *F15B 13/10* (2013.01); *F15B 15/18* (2013.01); *F15B 21/04* (2013.01); *F15B 20/002* (2013.01); *F15B 2211/205* (2013.01); *F15B 2211/327* (2013.01); *F15B 2211/7058* (2013.01)

(58) Field of Classification Search
CPC .... F15B 11/0423; F15B 11/055; F15B 15/18; F15B 20/002; F04B 1/34; F04B 17/03
See application file for complete search history.

(56) References Cited

U.S. PATENT DOCUMENTS 6,796,526 B2 9/2004 Boehringer
7,370,615 B2 5/2008 Loy
(Continued)

FOREIGN PATENT DOCUMENTS

EP 3112698 A1 1/2017
EP 3112699 A1 1/2017

OTHER PUBLICATIONS

Extended European Search Report for International Application No. 17305944.5 dated Feb. 20, 2018, 8 pages.

*Primary Examiner* — Thomas E Lazo
(74) *Attorney, Agent, or Firm* — Cantor Colburn LLP

(57) ABSTRACT

An electro hydrostatic actuator comprising a hydraulic pump driven by an electric motor to supply hydraulic fluid to a hydraulic actuator, the pump comprising an inlet and an outlet for the hydraulic fluid and an active flow path configured therebetween such that, in an active mode of operation when the pump is driven by the electric motor, hydraulic fluid is actively drawn in through the inlet and exhausted out through the outlet. The pump further comprises a bypass flow path configured to open between the inlet and outlet such that, in a damping mode of operation when the pump is not driven by the electric motor, hydraulic fluid is able to pass through the pump along the bypass flow path between the inlet and outlet. The hydraulic pump is a rotary piston pump comprising a pump barrel driven to rotate by a motor shaft.

14 Claims, 4 Drawing Sheets

(51) Int. Cl.
  *F15B 15/18* (2006.01)
  *F15B 13/10* (2006.01)
  *B64C 13/40* (2006.01)
  *F15B 21/04* (2019.01)
  *F15B 20/00* (2006.01)

(56) References Cited

U.S. PATENT DOCUMENTS

| | | | |
|---|---|---|---|
| 7,434,395 B2* | 10/2008 | He | F15B 15/18 |
| | | | 60/475 |
| 8,776,513 B2* | 7/2014 | Nishioka | A01D 34/74 |
| | | | 60/478 |
| 9,057,390 B2* | 6/2015 | Onishi | F15B 15/18 |
| 2013/0067898 A1 | 3/2013 | Onishi et al. | |
| 2015/0308463 A1* | 10/2015 | Gomm | F15B 11/003 |
| | | | 60/327 |
| 2017/0002844 A1* | 1/2017 | Lesage | B64C 13/42 |
| 2017/0002845 A1* | 1/2017 | Lesage | B64C 13/42 |

* cited by examiner

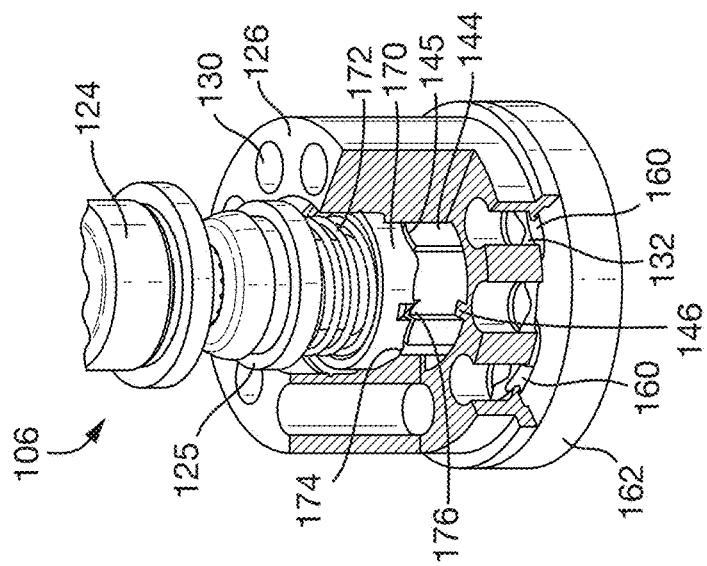
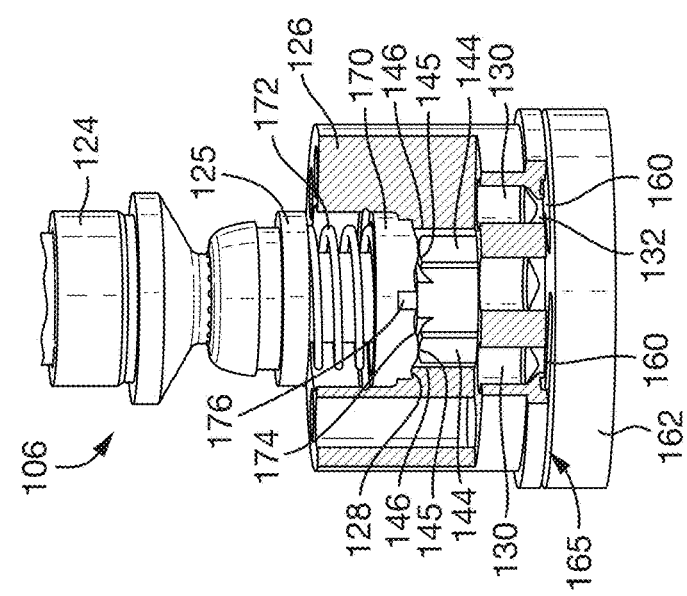
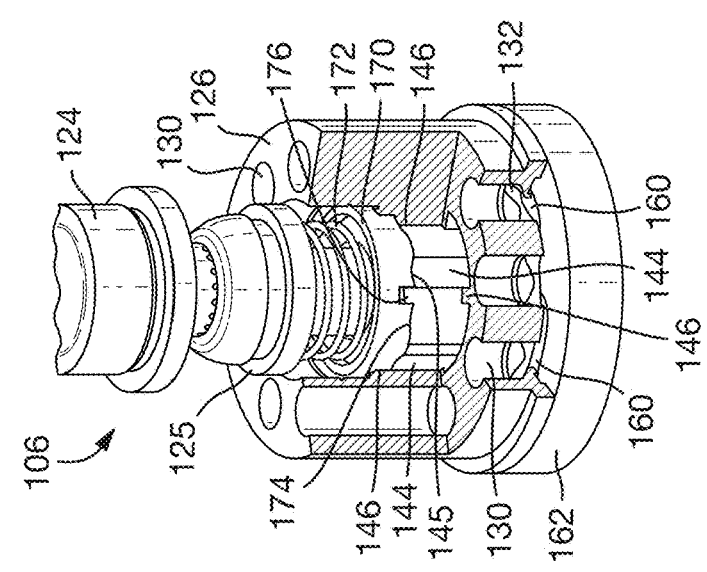

ELECTRO HYDROSTATIC ACTUATOR

FOREIGN PRIORITY

This application claims priority to European Patent Application No. 17305944.5 filed Jul. 17, 2017, the entire contents of which is incorporated herein by reference.

FIELD

The present disclosure relates to electro hydrostatic actuators and in particular to those comprising an electrically powered motor-pump assembly to generate pressure and flow control for the hydraulic actuator.

BACKGROUND

An electro hydrostatic actuator ("EHA") is a self-contained actuator run and controlled by its own electrically powered motor-pump assembly, thereby eliminating the need for a separate hydraulic pump. In aerospace applications, EHAs are typically a fly-by-wire ("FBW") device that is operated by control electronics. The hydraulic actuator of an EHA may be used to move aerodynamic surfaces such as a flap on an aircraft wing. EHAs may replace conventional hydraulic actuator systems in an aircraft for various operations, including e.g. landing gear retraction/extension, steering, braking, and fluid control.

Especially when EHAs are used to control components of aircraft operation, it is important to provide redundancy in the event of electrical power generation failure or control path electronics failure. It has previously been proposed, for example as seen in US 2013/0067898, for an EHA to comprise a failsafe hydraulic circuit that includes additional hydraulic oil paths allowing communication between the jack chambers of the hydraulic actuator and a solenoid "mode" valve that can be switched to connect the additional hydraulic oil paths and allow for a bypass flow of hydraulic oil outside the electrically-powered hydraulic pump, e.g. in an emergency state of power loss. In such an emergency state, the hydraulic actuator is still able to provide a damping force to its aerodynamic surface. This damping effect is switched on or off by the additional solenoid valve in the hydraulic circuit.

Previous developments in this field have included systems configured to open a bypass flow path through the hydraulic pump when the pump is not driven by the electric motor in a damping mode of operation. By opening a bypass flow path within the pump, the damping mode of operation is integrated into the pump rather than requiring an additional solenoid "mode" valve in the hydraulic circuit between the pump and the actuator.

The present disclosure seeks to provide improvements in arrangements that involve incorporating a bypass flow path through the pump of an electro-hydrostatic actuator.

SUMMARY

In an aspect the invention provides an electro hydrostatic actuator comprising: a hydraulic pump driven by an electric motor to supply hydraulic fluid to a hydraulic actuator; the pump comprising an inlet and an outlet for the hydraulic fluid and an active flow path configured therebetween such that, in an active mode of operation when the pump is driven by the electric motor, hydraulic fluid is actively drawn in through the inlet and exhausted out through the outlet; and the pump further comprising a bypass flow path configured to open between the inlet and outlet such that, in a damping mode of operation when the pump is not driven by the electric motor, hydraulic fluid is able to pass through the pump along the bypass flow path between the inlet and outlet; wherein the hydraulic pump is a rotary piston pump comprising a pump barrel driven to rotate by a motor shaft; wherein the pump further comprises a bypass port plate positioned at the base of the pump barrel and driven to rotate by the motor shaft; wherein in the damping mode of operation the pump barrel and the bypass port plate are configured to axially separate to form the bypass flow path through a gap between the pump barrel and the bypass port plate created by the separation of the pump barrel and the bypass port plate.

The above arrangement means that a bypass flow path may be created through the pump without having to rotate the pump barrel and bypass port plate relative to each other. Furthermore, it is not necessary to machine fluid conduits in the pump barrel.

The bypass flow path may be configured to automatically open when the pump is not driven by the electric motor. The bypass flow path may comprise one or more bypass ports in the bypass port plate.

A resilient member (e.g., a first resilient member) may be configured to rotate the pump barrel relative to the motor shaft in the bypass mode of operation to open the bypass flow path when the pump is not driven by the electric motor. The first resilient member may be configured to automatically open the bypass flow path when the pump is not driven by the electric motor.

The electro hydrostatic actuator may comprise a sensor configured to detect whether the bypass flow path is open between the inlet and outlet.

A plurality of axial cylinders in the pump barrel may be configured to receive reciprocating pistons. The inlet may have a fluid connection with the axial cylinders in one half of the pump barrel and the outlet may have a fluid connection with the axial cylinders in the other half of the pump barrel.

The pump barrel may comprise an inner circumferential surface and the motor shaft may comprise an outer circumferential surface, the inner and outer circumferential surfaces being drivingly connected by at least one engagement tooth on one of the inner and outer circumferential surfaces and at least one corresponding notch on the other of the inner and outer circumferential surfaces, configured such that there is a circumferential gap therebetween allowing for relative rotation between the pump barrel and the motor shaft.

The electro hydrostatic actuator may further comprise a resilient member (e.g., a second resilient member) configured to bias the pump barrel towards and/or against the bypass port plate. The resilient member may be a spring extending around the motor shaft.

The electro hydrostatic actuator may further comprise a washer located between the second resilient member and the pump barrel, wherein the second resilient member biases the washer against the pump barrel so as to bias the pump barrel towards and/or against the bypass port plate.

The washer may comprise a cam surface configured to contact a cooperating surface on the motor shaft, wherein rotation of the pump barrel relative to the motor shaft in the bypass mode of operation causes the surface on the motor shaft to ride up the cam surface and move the washer in a direction away from the bypass port plate and substantially remove the biasing force exerted by the second resilient member on the pump barrel.

In the active mode of operation the washer may be biased against the pump barrel by the resilient member, and may not substantially exert a force on the motor shaft (although some minimal or minor contact between the washer and the motor shaft may occur). In the bypass mode of operation, the motor shaft may rotate relative to the pump barrel (due to, e.g., the first resilient member).

The pump barrel and the washer may be fixed together rotationally, such that rotational movement of the pump barrel causes a corresponding rotational movement of the washer. This may cause the washed to rotate relative to the motor shaft, such that, e.g., the surface on the motor shaft can ride up the cam surface as described above, to move the washer in a direction away from the bypass port plate.

The cam surface may comprise a plurality of peaks and troughs, and the surface of the motor shaft may be configured in the active mode of operation to fall into a trough of the cam surface, such that the washer pushes the pump barrel into contact with the bypass port plate.

The surface of the motor shaft may be configured in the bypass mode of operation to ride up respective peaks of the cam surface, forcing the washer in a direction away from the bypass port plate and creating the gap between the pump barrel and the bypass port plate.

The electro hydrostatic actuator may comprise a rotary sensor configured to detect relative rotation between the pump barrel and the motor shaft or between the pump barrel and the bypass port plate.

In an aspect the invention provides a method of controlling and damping a hydraulic actuator, comprising: powering an electric motor to drive a hydraulic pump to supply hydraulic fluid to the hydraulic actuator in an active mode of operation, wherein the hydraulic pump is a rotary piston pump comprising a pump barrel driven to rotate by a motor shaft; and opening a bypass flow path through the hydraulic pump when the pump is not driven by the electric motor in a damping mode of operation, wherein the pump further comprises a bypass port plate positioned at the base of the pump barrel and driven to rotate by the motor shaft; wherein the step of opening a bypass flow path comprises axially separating the pump barrel and the bypass port plate to form the bypass flow path through a gap between the pump barrel and the bypass port plate created by the separation of the pump barrel and the bypass port plate.

BRIEF DESCRIPTION OF THE DRAWINGS

One or more non-limiting examples will now be described with reference to the accompanying drawings, in which:

FIG. 7 shows an example of a pump with positive torque applied according to the present disclosure, with a portion cutaway to show the inside of the pump.

FIG. 8 shows the pump of FIG. 7 with no torque applied.

FIG. 9 shows the pump of FIG. 7 with negative torque applied.

DETAILED DESCRIPTION

Figure 1:
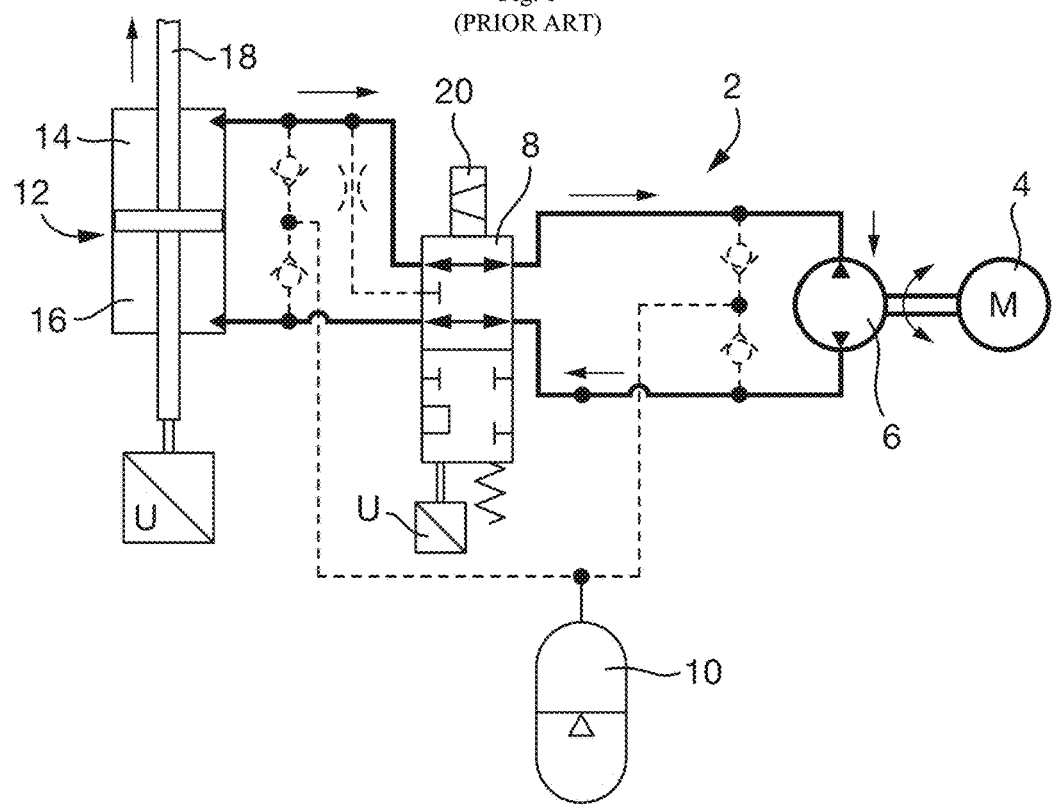
FIG. 1 shows a fluid flow diagram for an EHA in an active mode according to the prior art.
Figure 2:
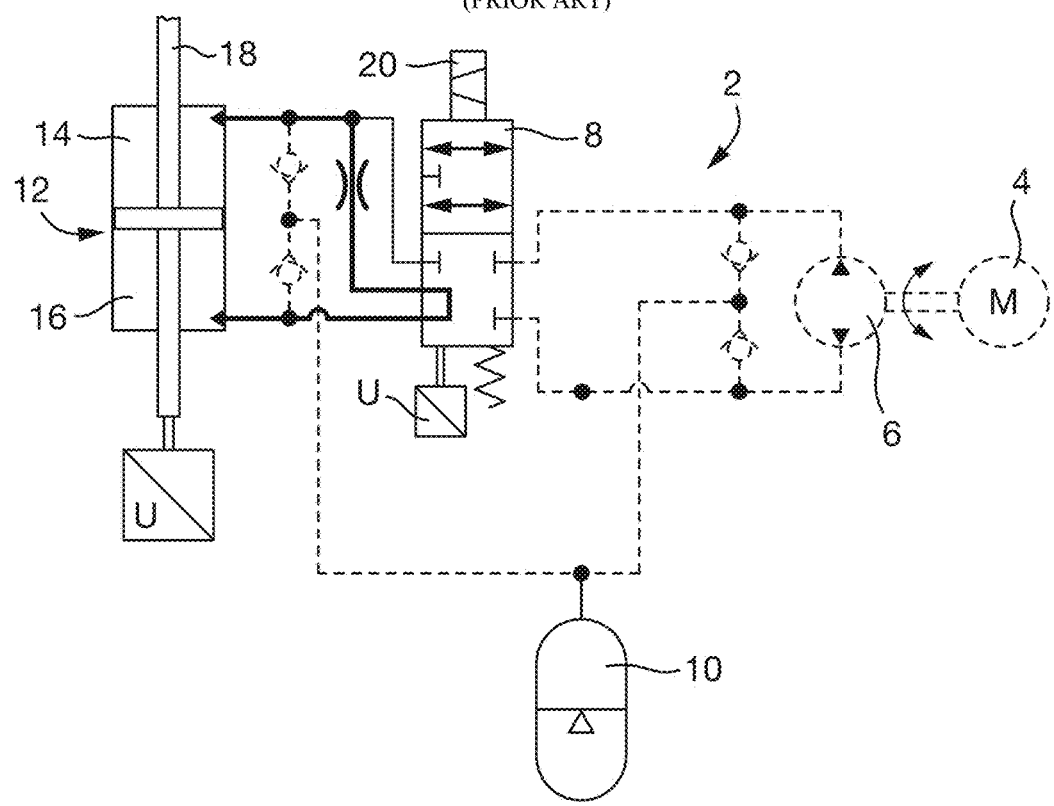
FIG. 2 shows a fluid flow diagram for an EHA in a damping mode according to the prior art.

FIGS. 1 and 2 show a fluid flow diagram for an electro hydrostatic actuator (EHA) 2 according to the prior art. FIG. 1 shows a reversible electric motor 4, a hydraulic pump 6, a mode valve 8, an accumulator 10 and a hydraulic actuator 12. The hydraulic actuator 12 shown in FIG. 1 consists of two separate chambers 14, 16 and an actuator ram 18. The mode valve 8 can be operated by a solenoid 20 and has two modes of operation which is typically on or off. The ram 18 is typically attached to a component on the aircraft such as an aerodynamic surface. The EHA typically has two modes of operation: an Electric Active Mode (EAM) and a damping mode. FIG. 1 shows the EHA in EAM. During EAM the motor 4 acts to drive the pump 6. This can be in either direction as the pump 6 is reversible. As the pump 6 is driven it causes hydraulic fluid to flow around a circuit as shown by the bold lines and the arrows in FIG. 1. This results in fluid being directed into one of the chambers 14, 16 of the hydraulic actuator 12. As fluid enters one of the chambers 14, 16 and leaves the other chamber 14, 16 this causes the ram 18 to move within the chambers 14, 16 which acts to move the aerodynamic surface it is attached to.

FIG. 2 shows a fluid flow diagram for the EHA 2 in damping mode. The damping mode can be initiated in circumstances where there is an electrical power generation failure or electronic control path failure. The solenoid 20 is capable of activating the mode valve 8 which alters the fluid flow within the system. The damping mode introduces a damping effect to the ram 18. This may be critical for certain applications of an EHA for example when in use on an aircraft. The damping mode is also the default mode when the ram 18 is not required to be engaged i.e. the pump 6 is not driven by the motor 4. The purpose of the damping mode is to provide a damping force to the ram 18 which may be connected to an aerodynamic surface, this prevents uncontrolled motion when external aerodynamic forces are applied to the surface. In the damping mode, fluid is free to flow between one chamber 14, 16 through the mode valve 8 and to the other chamber 14, 16 of the hydraulic actuator 12. The free flow of fluid between the two chambers 14, 16 acts to damp the motion of the ram 18. During the damping mode the fluid completely bypasses the pump 6 and only travels through the mode valve 8. The damping effect on the ram 18 is fixed by the mode valve 8.

Figure 3:
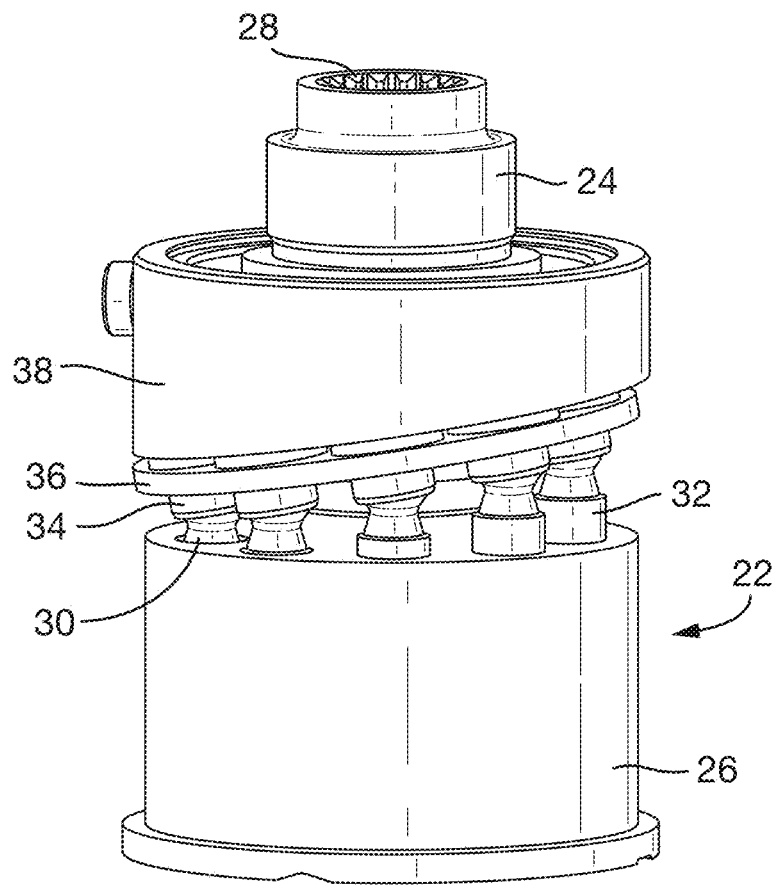
FIG. 3 shows a typical rotary piston pump.

FIG. 3 shows a typical rotary piston pump 22 operated by a motor shaft 24. The motor shaft 24 drives a pump barrel 26 by the connection of splines on the circumference of the motor shaft (not shown) and corresponding splines (not shown) on the internal surface of the pump barrel 26. The splines typically have a one to one correspondence and thus there is minimal relative rotation between the motor shaft 24 and the pump barrel 26. Internal splines 28 on the rear end of the motor shaft 24 provide for connection between the motor shaft 24 and the motor itself (not shown). The pump 22 is comprised of a pump barrel 26 with axial cylinders 30 extending therethrough. The spacing of the axial cylinders 30 is equiangular with respect to the centre of the pump barrel 26. Pistons 32 are present within the axial cylinders 30 and are free to reciprocate within the cylinders 30. The pistons 32 are linked by shoes 34 to a rotating plate 36 guided by a cam plate 38. The cam plate 38 is orientated at an angle such that, at any moment in time, at one side the pistons 32 are fully inserted in the cylinders 30 and at the other side they are drawn out of the cylinders 30.

During typical operation of the pump 22 the motor shaft 28, driven by a motor, drives the pump barrel 26 causing it to rotate. As the pump barrel 26 rotates the pistons 32 reciprocate within the axial cylinders 30 causing fluid to be drawn into the pump barrel 26 on one side and expelled on the opposite side of the barrel 26. Although the cam plate 38 is shown at a fixed angle, it may be adjustable to control the amount of fluid that is being displaced from the pump.

Figure 4:
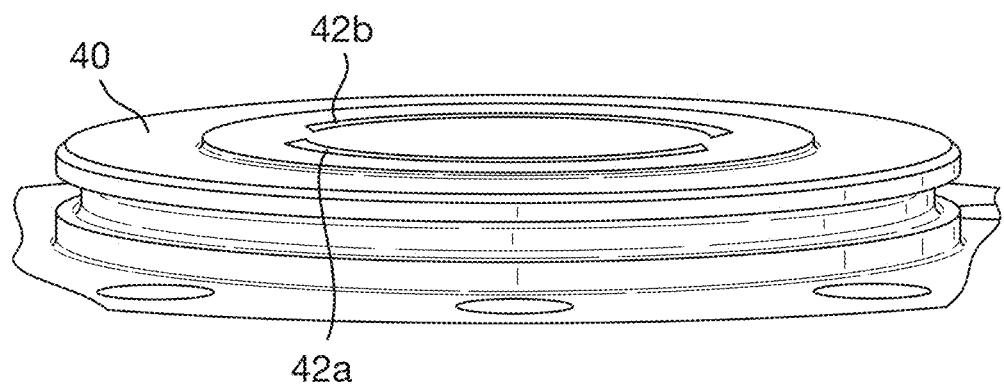
FIG. 4 shows the port plate of a typical rotary piston pump.

FIG. 4 shows a view of the underside of the pump 22 and shows in detail the port plate 40 which is attached to the base of the pump barrel 26. On the port plate 40 are two ports 42 which provide access to the cylinders 30 of the pump barrel 26. The ports 42 are semi-circular and follow the same arc as the circumferential positioning of the cylinders 30 in the pump barrel 26. The purpose of the provision of two ports 42 with a spacing between them is to prevent fluid being drawn in from the expulsion side of the pump. The gap between the ports 42 effectively corresponds to the points of change in gradient on the cam plate 38 from a positive to negative gradient or negative to positive gradient. One port 42a acts as an inlet to the pump 22 while the other port 42b acts as an outlet, or vice versa.

Figure 5:
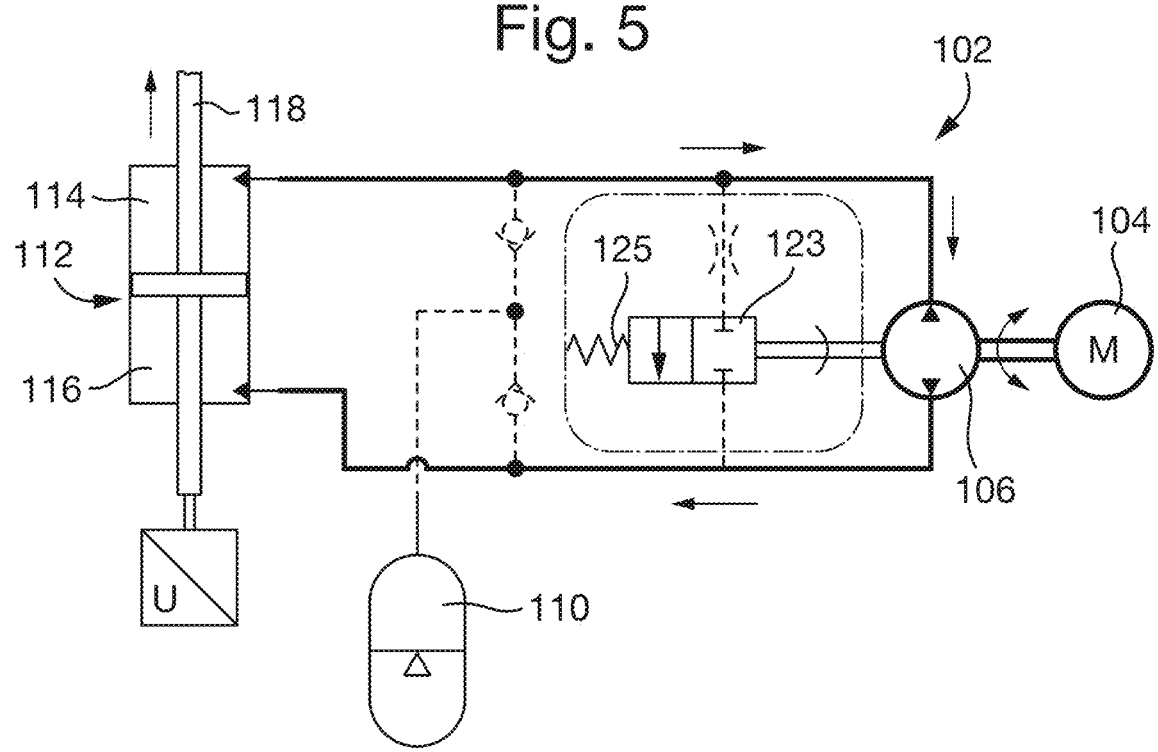
FIG. 5 shows a fluid flow diagram for an EHA in an active mode according to the present disclosure.
Figure 6:
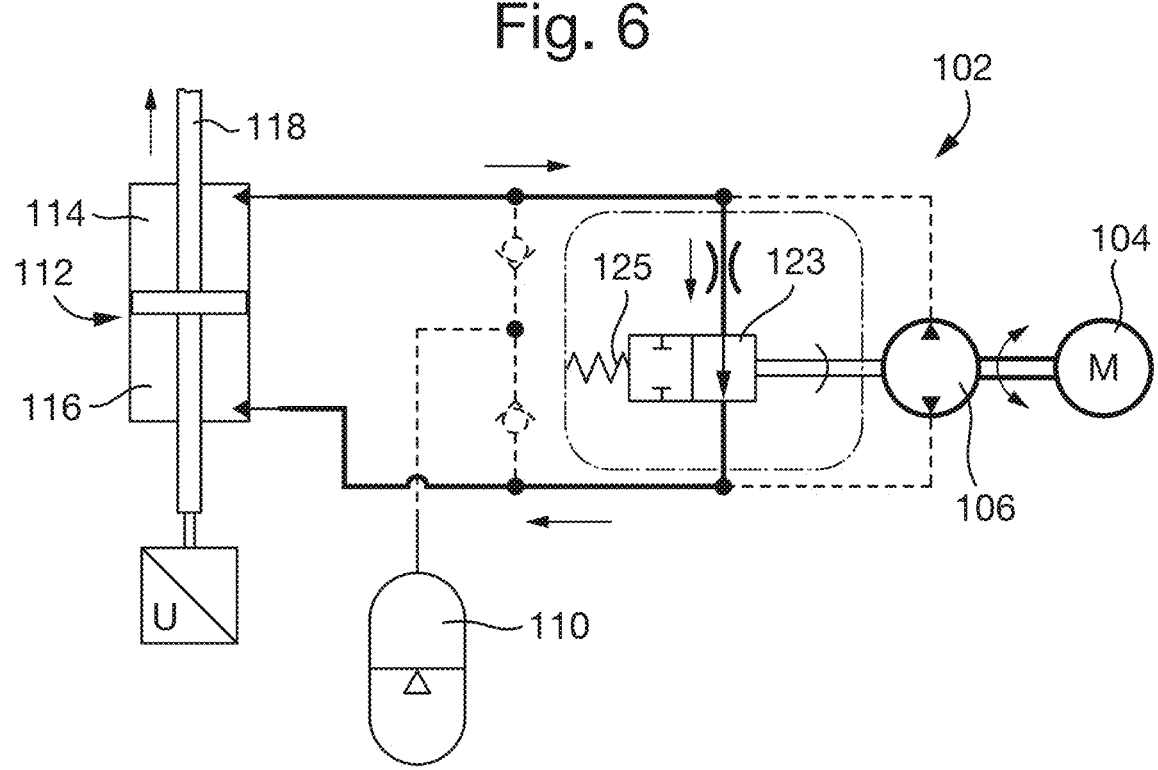
FIG. 6 shows a fluid flow diagram for an EHA in a damping mode according to the present disclosure.

FIGS. 5 and 6 show exemplary fluid flow diagrams according to the present disclosure. Instead of the damping mode being achieved by having a mode valve separate to the pump, it is now provided by a bypass flow path 123 incorporated internally within the pump 106. FIG. 5 shows a motor 104 which is operatively connected to a pump 106. Within the pump 106 there is an incorporated bypass flow path 123. The bypass flow path 123 is opened by a spring 125. FIG. 5 shows the pump during typical operation. During active mode the motor 104 rotates to operate the pump 106 which drives fluid around the circuit 102 through the pump 106. The fluid can be driven to/from the chambers 114, 116 of the hydraulic actuator 112 via the fluid path shown in bold and with corresponding arrows.

FIG. 6 shows the pump 106 operating in damping mode. In damping mode the motor 104 is no longer active and as a result the pump 106 is no longer driven. In this damping mode, fluid in each of the hydraulic actuator's chambers 114, 116 is free to flow along the bypass flow path 123 which is through the pump 106 to the other chamber 114, 116. This would not be possible in a typical piston pump as there is no means for the fluid to transfer from the cylinders on one side of the pump to the other side. This is possible with the present disclosure and can be seen in the following Figs.

FIGS. 7-9 show a pump 106 in accordance with an example of the present disclosure. FIG. 7 shows the motor shaft 124 and pump barrel 126 when positive torque is applied to the pump barrel 126. The pump 106 further comprises a bypass port plate 162 that is attached to or forms part of the motor shaft 124, such that it is rotatable with the motor shaft 124. A stationary nut 125 is located on the motor shaft 124 and is fixed against movement relative to the motor shaft 124.

The motor shaft 124 is positioned within the core of the pump barrel 126 and has circumferential notches 144 which engage with corresponding notches 146 on an inner surface of the pump barrel 126. The notches 144 on the motor shaft 124 are spaced apart such that there is a certain degree of relative rotation between the motor shaft 124 and the pump barrel 126 before they become engaged. That is, the pump barrel 126 can rotate relative to the motor shaft 124 and the bypass port plate 162 when there is no torque applied, i.e., before they become engaged when the motor shaft 124 is driven to rotate.

The cylinders 130 in the pump barrel 126 comprise apertures 132 at a lower end of the pump barrel 126, which form openings for the flow of hydraulic fluid in use. The bypass port plate 162 comprises apertures 160 that may provide bypass ports for a bypass flow path, as will be explained below. Although not shown in these Figs., the pump 106 may also comprise a typical port plate 40, as shown in FIG. 4, positioned below the bypass port plate 162. A washer 170 is located within the core of the pump barrel 126 and contacts a surface 128 (see FIG. 8) of the barrel 126. A spring 172 or other resilient member is located between the washer 170 and the stationary nut 125. The spring 172 is configured to bias the washer 170 (and barrel 126) towards the bypass port plate 162. The washer 170 comprises a cam surface 174 that is configured to contact an upper surface 145 of the notches 144. The cam surface 174 may have a wavy profile comprising a plurality of peaks and a plurality of troughs.

During the active mode, when the motor shaft 124 drives the pump barrel 126, the bypass port plate 162 and barrel 126 are aligned and in contact such that the apertures 160 in the bypass port plate 162 are aligned with the cylinders 130 to provide an axial fluid flow. As the motor shaft 124 drives the barrel 126, fluid is drawn in through the apertures 160 in the bypass port plate 162 and forced out of the cylinders 130. Furthermore, the upper surface 145 of the notches 144 is configured to fall into a trough of the cam surface 174, such that the washer 170 pushes the pump barrel 126 into contact with the bypass port plate 162. This is the case when both a positive or negative torque is applied to the barrel 126 as seen in FIGS. 7 and 9.

During damping mode, as depicted by FIG. 8, when the motor shaft 124 is not driven, a resilient member (not shown) causes the pump barrel 126 and motor shaft 124 to rotate relative to each other. The pump barrel 126 and the washer 170 may be fixed together rotationally, for example the notches 146 on the inner surface of the pump barrel 126 may extend into slots 176 on the washer 170 (see also FIGS. 7 and 9). This means that rotational movement of the pump barrel 126 causes a corresponding rotational movement of the washer 170, which will also rotate relative to the motor shaft 124 such that the notches 144 rotate relative to the cam washer 170. This causes the surfaces 145 of the notches 144 to ride up respective peaks of the cam surface 174, forcing the cam washer 170 in a direction away from the bypass port plate 162. This creates a gap between the cam washer 170 and the surface 128 of the pump barrel 126.

Due to the hydraulic pressure in the apertures 160, the pump barrel 126 is forced in an axial direction (e.g., the longitudinal axis of the motor shaft 124) away from the bypass port plate 162, creating a gap 165 between the bypass port plate 162 and the pump barrel 126. This forms a bypass flow path through the circumferential gap 165 allowing fluid to flow freely through the pump 106 around the motor shaft 124. That is, a circumferential bypass flow path is achieved in the pump 106 around the circumference of the barrel 126, i.e., around the motor shaft 124 rather than through the motor shaft 124.

In the pump shown in FIGS. 7-9 the damping can be adjusted by adapting the size of the apertures 160 and/or their spacing. The level of damping may be adjusted during manufacture; this may for instance be achieved by machining the apertures 160 to a larger size and/or with a different spacing. It may also be possible to provide inserts that sit within the apertures 160 to restrict the flow of fluid and thus change the level of damping. Alternatively a set of bypass port plates 162 may be available and different plates 162 could be attached to the barrel 126 depending on the required level of damping. Such plates may be chosen during manufacture of the pump 106 or even interchanged at a later time during service life.

The pump 106 features a bypass flow path that is facilitated effectively by a two-part barrel: the barrel 126 and the bypass port plate 162. Manufacturing the pump in this way is particularly advantageous as machining the cylinders 130 within the barrel 126 and machining the apertures 160 in the separate bypass port plate 162 can more easily be achieved than machining both cylinders and bypass ports in a single part barrel.

The pump 106 may comprise a housing (not shown) that surrounds the motor shaft 124 and the pump barrel 126. The housing may be configured to sealingly engage both the pump barrel 126 and the bypass port plate 162, so as to contain flow between those parts when the gap 165 exists in the bypass mode. One or more seals may be provided between the housing and the pump barrel 126 and the housing and the bypass port plate 162. For example, a static seal may be provided between one of the pump barrel 126 and the bypass port plate 162, and a moving or sliding seal may be provided between the other of the pump barrel 126 and the bypass port plate 162.

The examples disclosed above relate to a rotary piston pump, but it will be appreciated that other types of pump may be used instead. Furthermore, although in the examples shown the angle of the cam plate is fixed, it is appreciated that changing the angle of the cam plate alters the amount of fluid drawn in and expelled by the pump, therefore it may be adjustable in order for the flow rate of fluid to be modified e.g. depending on the application of the pump.

The above embodiments provide a particularly suitable method of achieving a bypass flow path without having to rotate the pump barrel 126 relative to the bypass port plate 162. This reduces friction that may otherwise be caused by such rotation between these parts. Whilst it is acknowledged that there may be components that do rotate relative to each other, for example the cam washer 170 and the notches 144, it will be appreciated that replacing a cam washer 170 is relatively inexpensive and easier than replacing either the pump barrel 126 or the bypass port plate 162.

Although the present disclosure has been described with reference to preferred embodiments, it will be understood by those skilled in the art that various changes in form and detail may be made without departing from the scope of the disclosure as set forth in the accompanying claims.

The invention claimed is:

1. An electro hydrostatic actuator comprising:
    a hydraulic pump driven by an electric motor to supply hydraulic fluid to a hydraulic actuator, the pump comprising:
        an inlet and an outlet for the hydraulic fluid and an active flow path configured therebetween such that, in an active mode of operation when the pump is driven by the electric motor, hydraulic fluid is actively drawn in through the inlet and exhausted out through the outlet; and
        a bypass flow path configured to open between the inlet and outlet such that, in a damping mode of operation when the pump is not driven by the electric motor, hydraulic fluid is able to pass through the pump along the bypass flow path between the inlet and outlet;
    wherein the hydraulic pump is a rotary piston pump comprising a pump barrel driven to rotate by a motor shaft and the pump further comprises:
        a bypass port plate positioned at the base of the pump barrel and driven to rotate by the motor shaft;
    wherein in the damping mode of operation the pump barrel and the bypass port plate are configured to axially separate to form the bypass flow path through a gap between the pump barrel and the bypass port plate created by the separation of the pump barrel and the bypass port plate.

2. An electro hydrostatic actuator according to claim 1, wherein the bypass flow path is configured to automatically open when the pump is not driven by the electric motor.

3. An electro hydrostatic actuator according to claim 2, wherein the pump comprises a first resilient member configured to automatically open the bypass flow path when the pump is not driven by the electric motor.

4. An electro hydrostatic actuator according to claim 3, wherein the first resilient member is configured to rotate the pump barrel relative to the motor shaft in the bypass mode of operation to open the bypass flow path when the pump is not driven by the electric motor.

5. An electro hydrostatic actuator according to claim 1, comprising a sensor configured to detect whether the bypass flow path is open between the inlet and outlet).

6. An electro hydrostatic actuator according to claim 1, wherein a plurality of axial cylinders in the pump barrel are configured to receive reciprocating pistons, wherein the inlet has a fluid connection with the axial cylinders in one half of the pump barrel and the outlet has a fluid connection with the axial cylinders in the other half of the pump barrel.

7. An electro hydrostatic actuator according to claim 1, wherein the pump barrel comprises an inner circumferential surface and the motor shaft comprises an outer circumferential surface, the inner and outer circumferential surfaces being drivingly connected by at least one engagement tooth on one of the inner and outer circumferential surfaces and at least one corresponding notch on the other of the inner and outer circumferential surfaces, configured such that there is a circumferential gap therebetween allowing for relative rotation between the pump barrel and the motor shaft.

8. An electro hydrostatic actuator according to claim 1, further comprising a second resilient member configured to bias the pump barrel towards and/or against the bypass port plate.

9. An electro hydrostatic actuator according to claim 8, further comprising a washer located between the second resilient member and the pump barrel, wherein the second resilient member biases the washer against the pump barrel so as to bias the pump barrel towards and/or against the bypass port plate.

10. An electro hydrostatic actuator according to claim 9, wherein the washer comprises a cam surface configured to contact a cooperating surface on the motor shaft, wherein rotation of the pump barrel relative to the motor shaft in the bypass mode of operation causes the surface on the motor shaft to ride up the cam surface and move the washer in a direction away from the bypass port plate and substantially remove the biasing force exerted by the second resilient member on the pump barrel.

11. An electro hydrostatic actuator according to claim 9, wherein the cam surface comprises a plurality of peaks and troughs, and the surface of the motor shaft is configured in the active mode of operation to fall into a trough of the cam surface, such that the washer pushes the pump barrel into contact with the bypass port plate.

12. An electro hydrostatic actuator according to claim 11, wherein the surface of the motor shaft is configured in the bypass mode of operation to ride up respective peaks of the cam surface, forcing the washer in a direction away from the bypass port plate.

13. An electro hydrostatic actuator according to claim 1, comprising a rotary sensor configured to detect relative rotation between the pump barrel and the motor shaft or between the pump barrel and the bypass port plate.

14. A method of controlling and damping a hydraulic actuator, comprising:
- powering an electric motor to drive a hydraulic pump to supply hydraulic fluid to the hydraulic actuator in an active mode of operation, wherein the hydraulic pump is a rotary piston pump comprising a pump barrel driven to rotate by a motor shaft; and
- opening a bypass flow path through the hydraulic pump when the pump is not driven by the electric motor in a damping mode of operation, wherein the pump further comprises a bypass port plate positioned at the base of the pump barrel and driven to rotate by the motor shaft;
- wherein the step of opening a bypass flow path comprises axially separating the pump barrel and the bypass port plate to form the bypass flow path through a gap between the pump barrel and the bypass port plate created by the separation of the pump barrel and the bypass port plate.

* * * * *